US010657231B2

(12) United States Patent
Chellappa et al.

(10) Patent No.: US 10,657,231 B2
(45) Date of Patent: *May 19, 2020

(54) PROVIDING AN AUTHENTICATING SERVICE OF A CHIP

(71) Applicant: International Business Machines Corporation, Armonk, NY (US)

(72) Inventors: Srivatsan Chellappa, Hopewill Junction, NY (US); Subramanian S. Iyer, Mount Kisco, NY (US); Toshiaki Kirihata, Poughkeepsie, NY (US); Sami Rosenblatt, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/238,738

(22) Filed: Jan. 3, 2019

(65) Prior Publication Data

US 2019/0155999 A1 May 23, 2019

Related U.S. Application Data

(63) Continuation of application No. 15/489,036, filed on Apr. 17, 2017, now Pat. No. 10,262,119, which is a
(Continued)

(51) Int. Cl.
*G06F 21/30* (2013.01)
*G09C 1/00* (2006.01)
(Continued)

(52) U.S. Cl.
CPC .............. *G06F 21/30* (2013.01); *G01C 1/00* (2013.01); *G06F 21/44* (2013.01); *G09C 1/00* (2013.01);
(Continued)

(58) Field of Classification Search
CPC ....... G06F 21/72; G06F 21/31; H04L 9/0866; H04L 9/3271
(Continued)

(56) References Cited

U.S. PATENT DOCUMENTS 5,157,664 A  10/1992 Waite
5,982,899 A  11/1999 Probst
(Continued)

FOREIGN PATENT DOCUMENTS

CN  101291224 A  10/2008
CN  101409620 A   4/2009
(Continued)

OTHER PUBLICATIONS

Rosenblatt, S. et al., "A Self-Authenticating Chip using an Intrinisic Chip ID", IBM Systems and Technology Group, Hopewell Junction, New York, 3 pages. No publication date cited.
(Continued)

*Primary Examiner* — Bryan F Wright
(74) *Attorney, Agent, or Firm* — Steven J. Meyers; Maxine L. Barasch; Keohane & D'Alessandro PLLC

(57) ABSTRACT

Embodiments of the present invention provide an authenticating service of a chip having an intrinsic identifier (ID). In a typical embodiment, an authenticating device is provided that includes an identification (ID) engine, a self-test engine, and an intrinsic component. The intrinsic component is associated with a chip and includes an intrinsic feature. The self-test engine retrieves the intrinsic feature and communicates it to the identification engine. The identification engine receives the intrinsic feature, generates a first authentication value using the intrinsic feature, and stores the authentication value in memory. The self-test engine generates a second authentication value using an authentication challenge. The identification engine includes a compare
(Continued)

circuitry that compares the first authentication value and the second authentication value and generates an authentication output value based on the results of the compare of the two values.

17 Claims, 7 Drawing Sheets

Related U.S. Application Data continuation of application No. 14/658,611, filed on Mar. 16, 2015, now Pat. No. 9,690,927, which is a continuation of application No. 13/707,964, filed on Dec. 7, 2012, now Pat. No. 9,038,133.

(51) Int. Cl.
| | |
|---|---|
| *H04L 9/32* | (2006.01) |
| *G06F 21/44* | (2013.01) |
| *G01C 1/00* | (2006.01) |
| *G11B 20/00* | (2006.01) |
| *H04L 29/06* | (2006.01) |
| *H04N 1/32* | (2006.01) |

(52) U.S. Cl.
CPC ...... *G11B 20/00086* (2013.01); *H04L 9/3247* (2013.01); *H04L 63/08* (2013.01); *H04N 1/32144* (2013.01); *G06F 2221/2129* (2013.01); *H04L 9/3278* (2013.01)

(58) Field of Classification Search
USPC .......................................................... 726/2
See application file for complete search history.

(56) References Cited

U.S. PATENT DOCUMENTS

| | | | | |
|---|---|---|---|---|
| 7,840,803 | B2* | 11/2010 | Clarke | G06F 21/31 |
| | | | | 713/168 |
| 7,898,283 | B1* | 3/2011 | Koushanfar | G06F 21/72 |
| | | | | 326/47 |
| 8,065,718 | B2 | 11/2011 | Grove et al. | |
| 8,590,010 | B2 | 11/2013 | Fainstein et al. | |
| 8,595,498 | B2 | 11/2013 | Junod | |
| 8,667,265 | B1* | 3/2014 | Hamlet | H04L 9/0866 |
| | | | | 326/80 |
| 9,038,133 | B2 | 5/2015 | Chellappa et al. | |
| 9,330,788 | B2 | 5/2016 | Anzou | |
| 9,690,927 | B2 | 6/2017 | Chellappa et al. | |
| 2003/0204743 | A1 | 10/2003 | Devadas et al. | |
| 2004/0049468 | A1 | 3/2004 | Walmsley | |
| 2004/0060017 | A1 | 3/2004 | Abdennadher | |
| 2006/0059395 | A1 | 3/2006 | Su et al. | |
| 2006/0221686 | A1 | 10/2006 | Devadas et al. | |
| 2008/0229119 | A1 | 9/2008 | Skoric et al. | |
| 2008/0263362 | A1 | 10/2008 | Chen | |
| 2008/0279373 | A1 | 11/2008 | Erhart et al. | |
| 2009/0083833 | A1 | 3/2009 | Ziola et al. | |
| 2009/0158445 | A1 | 6/2009 | Dewar | |
| 2009/0217045 | A1 | 8/2009 | Skoric et al. | |
| 2009/0282259 | A1 | 11/2009 | Skoric et al. | |
| 2010/0122093 | A1 | 5/2010 | Tuyls et al. | |
| 2010/0122353 | A1 | 5/2010 | Koushanfar et al. | |
| 2010/0127822 | A1 | 5/2010 | Devadas | |
| 2010/0146261 | A1 | 6/2010 | Talstra et al. | |
| 2010/0177898 | A1 | 7/2010 | Tuyls et al. | |
| 2010/0287374 | A1 | 11/2010 | Roy et al. | |
| 2010/0289590 | A1 | 11/2010 | von Staudt et al. | |
| 2011/0215829 | A1 | 9/2011 | Merchan et al. | |
| 2012/0033810 | A1 | 2/2012 | Devadas et al. | |
| 2012/0131340 | A1 | 5/2012 | Teuwen et al. | |
| 2012/0168506 | A1 | 7/2012 | Ruehrmair et al. | |
| 2012/0182041 | A1 | 7/2012 | Laackmann et al. | |
| 2012/0183135 | A1 | 7/2012 | Paral et al. | |
| 2012/0278893 | A1 | 11/2012 | Jyothi et al. | |
| 2012/0293354 | A1 | 11/2012 | Suzuki | |
| 2013/0133031 | A1 | 5/2013 | Fainstein et al. | |
| 2013/0147511 | A1* | 6/2013 | Koeberl | H03K 19/23 |
| | | | | 326/8 |
| 2013/0163764 | A1 | 6/2013 | van den Berg et al. | |
| 2013/0187764 | A1* | 7/2013 | Smith | H04L 9/3271 |
| | | | | 340/10.42 |
| 2014/0033330 | A1 | 1/2014 | Fainstein et al. | |
| 2014/0100807 | A1 | 4/2014 | Rosenblatt et al. | |
| 2014/0108786 | A1* | 4/2014 | Kreft | G06F 21/71 |
| | | | | 713/156 |
| 2014/0111234 | A1* | 4/2014 | Laackmann | G01R 31/31719 |
| | | | | 324/750.3 |
| 2014/0165141 | A1 | 6/2014 | Chellappa et al. | |
| 2015/0186639 | A1 | 7/2015 | Chellappa et al. | |
| 2017/0220784 | A1 | 8/2017 | Chellappa et al. | |

FOREIGN PATENT DOCUMENTS

| | | |
|---|---|---|
| EP | 2302555 A2 | 3/2011 |
| WO | 2012014623 A1 | 2/2012 |

OTHER PUBLICATIONS

Ben Widdows, Application No. GB1320411.0, UK Examination Report, dated May 7, 2014, 7 pages.
Ben Widdows, Application No. GB 1320411.0, UK Examination Report, dated Jan. 30, 2015, 3 pages
Bryan F. Wright, USPTO Office Action, U.S. Appl. No. 13/707,964, Notification dated Apr. 25, 2014, 30 pages.
Bryan F. Wright, USPTO Final Office Action, U.S. Appl. No. 13/707,964, dated Sep. 25, 2014, 19 pages.
Bryan F. Wright, USPTO Notice of Allowance and Fee(s) Due, U.S. Appl. No. 13/707,964, dated Dec. 15, 2014, 19 pages.
Bryan F. Wright, USPTO Office Action, U.S. Appl. No. 14/658,611, Notification dated May 27, 2016, 21 pages.
Bryan F. Wright, USPTO Final Office Action, U.S. Appl. No. 14/658,611, Notification dated Oct. 27, 2016, 15 pages.
Bryan F. Wright, USPTO Notice of Allowance and Fee(s) Due, U.S. Appl. No. 14/658,611, Notification dated May 27, 2016, 9 pages.
Bryan F. Wright, USPTO Office Action, U.S. Appl. No. 15/489,036, Notification dated Mar. 27, 2018, 32 pages.
Bryan F. Wright, USPTO Notice of Allowance and Fees Due, U.S. Appl. No. 15/489,036, Notification dated Oct. 4, 2018, 9 pages.

* cited by examiner

PROVIDING AN AUTHENTICATING SERVICE OF A CHIP

RELATED U.S. APPLICATION DATA

The present patent document is a continuation of U.S. patent application Ser. No. 15/489,036, filed Apr. 17, 2017, the entire contents of which is incorporated herein by reference. U.S. patent application Ser. No. 15/489,036 is a continuation of U.S. patent application Ser. No. 14/658,611, filed Mar. 16, 2015, U.S. Pat. No. 9,690,927, issued Jun. 27, 2017, the entire contents of which is incorporated herein by reference. U.S. patent application Ser. No. 14/658,611 is a continuation of U.S. patent application Ser. No. 13/707,964, filed Dec. 7, 2012, U.S. Pat. No. 9,038,133, issued May 19, 2015, the entire contents of which is incorporated herein by reference.

FIELD OF THE INVENTION

In general, embodiments of the present invention relate to system hardware. Specifically, embodiments of the present invention relate to a self-authenticating chip having an intrinsic chip identifier (ID).

BACKGROUND OF THE INVENTION

In today's global marketplace, the growing use of counterfeit information technology (IT) computer and hardware equipment is a difficult challenge facing businesses across the world. Counterfeit hardware is becoming harder to identify, as it may display high technical specifications and reputed brand names. Counterfeit IT hardware cuts into the revenue of hundreds of legitimate players in the supply chain including dealers, suppliers, and manufacturers. For these legitimate companies, the losses and damages may be significant because counterfeit IT hardware competes with authentic hardware. Ultimately, it may affect a brand's reputation and marketplace equity.

SUMMARY OF THE INVENTION

Embodiments of the present invention provide an authenticating service of a chip using an intrinsic component. In a typical embodiment, an authenticating device is provided that includes an identification (ID) engine, a self-test engine, and an intrinsic component. The intrinsic component is associated with a chip and includes an intrinsic feature. For ID generation, the self-test engine retrieves the intrinsic feature and communicates it to the identification engine. The identification engine receives the intrinsic feature, generates a first authentication value using the intrinsic feature, and stores the authentication value in memory. For ID authentication, the self-test engine generates a second authentication value using an authentication challenge. The identification engine includes a compare circuitry that compares the first authentication value and the second authentication value and generates an authentication output value based on the results of the compare of the two values.

A first aspect of the present invention provides a system for providing an authenticating service of a chip, the system comprising: an authenticating device comprising an identification engine, a self-test engine, and an intrinsic component, wherein the intrinsic component is associated with a chip and comprises an intrinsic feature; the self-test engine configured to retrieve the intrinsic feature and communicate the intrinsic feature to the identification engine; the identification engine further configured to receive the intrinsic feature, generate a first authentication value using the intrinsic feature, and store the authentication value in memory; the self-test engine further configured to generate a second authentication value using an authentication challenge; the identification engine further comprising a compare circuitry configured to compare the first authentication value and the second authentication value; and the compare circuitry further configured to generate an authentication output value based on the results of the compare of the first authentication value and the second authentication value.

A second aspect of the present invention provides a method for providing an authenticating service of a chip, the method comprising: retrieving an intrinsic feature at a self-test engine, wherein the intrinsic feature is derived from an intrinsic component and the intrinsic feature is associated with a chip; receiving the intrinsic feature at an identification engine; generating a first authentication value using the intrinsic feature at the identification engine; storing the first authentication value in memory; generating a second authentication value at the self-test engine using an authentication challenge; comparing the first authentication value and the second authentication value at a compare circuitry; and generating an authentication output value at the compare circuitry based on the results of the compare of the first authentication value and the second authentication value.

A third aspect of the present invention provides a method for deploying a system for providing an authenticating service of a chip, the system comprising a database and an authenticating device comprising an identification engine, a self-test engine, and an intrinsic component, wherein the intrinsic component is associated with a chip and comprises an intrinsic feature; the self-test engine configured to retrieve the intrinsic feature and communicate the intrinsic feature to the identification engine; the identification engine further configured to receive the intrinsic feature, generate a first authentication value using the intrinsic feature, and store the authentication value in memory; the self-test engine further configured to generate a second authentication value using an authentication challenge generated by the database; the identification engine further comprising a compare circuitry configured to compare the first authentication value and the second authentication value; and the compare circuitry further configured to generate an authentication output value to the database based on the results of the compare of the first authentication value and the second authentication value, and the database confirming the authentication output value.

BRIEF DESCRIPTION OF THE DRAWINGS

These and other features of this invention will be more readily understood from the following detailed description of the various aspects of the invention taken in conjunction with the accompanying drawings in which.

Figure 1A:
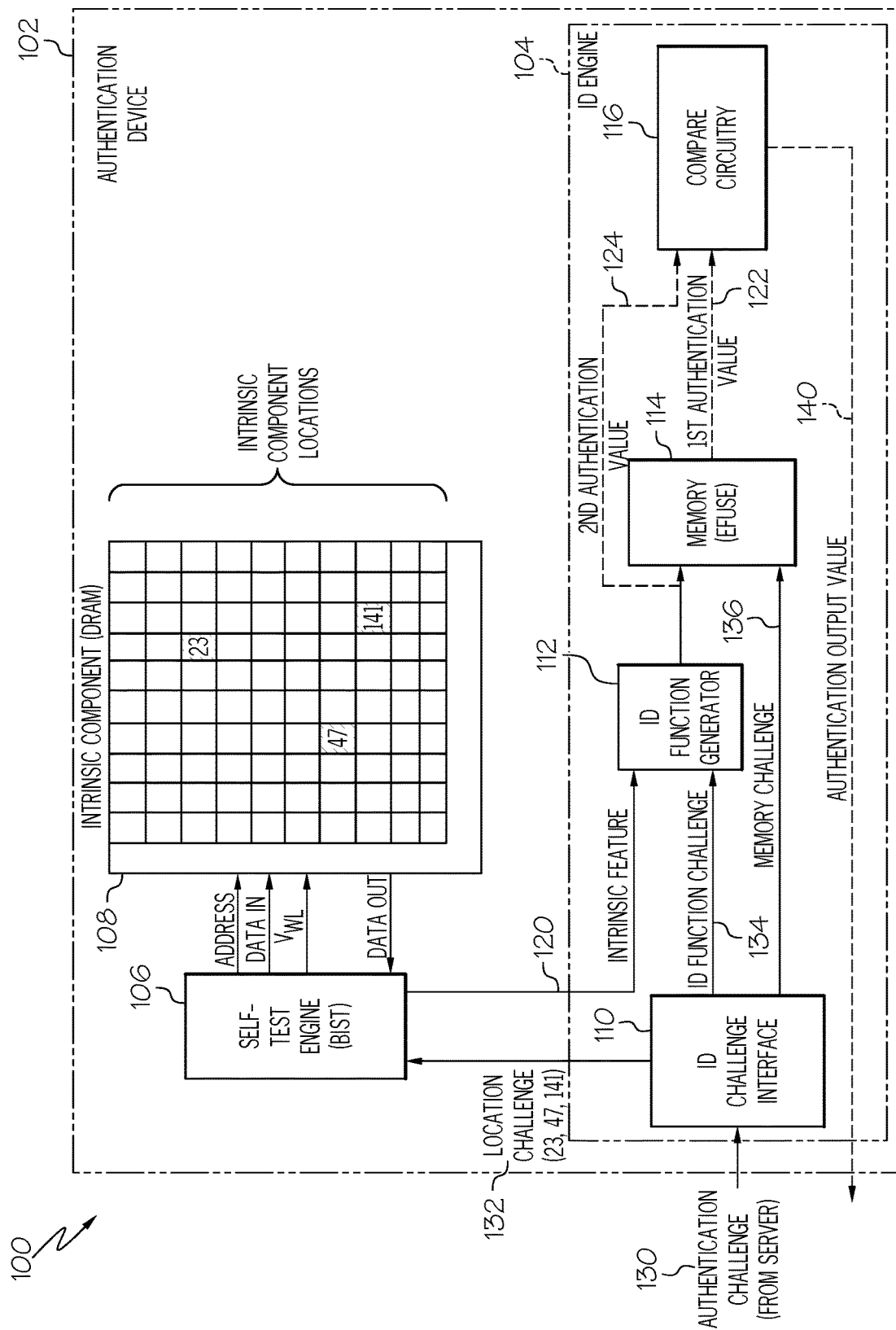
FIG. 1a depicts an example implementation of the self-authenticated intrinsic identifier (ID) methodology according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. The terms "first" and "$1^{st}$" are used interchangeably, as well as the terms "second" and "$2^{nd}$".

It will be understood that, although the terms first, second, third, etc., may be used herein to describe various buffers, cores, grades, and/or memories, these buffers, cores, grades, and/or memories should not be limited by these terms. These terms are only used to distinguish one buffer, core, grade, or memory from another buffer, core, grade, or memory. Thus, a first buffer, core, grade, or memory discussed below could be termed a second buffer, core, grade, or memory without departing from the teachings of the present inventive concept.

Embodiments are described herein with reference to cross-sectional or perspective illustrations that are schematic illustrations of idealized embodiments (and intermediate structures). As such, variations from the shapes of the illustrations as a result, for example, of manufacturing techniques and/or tolerances are to be expected. Thus, embodiments should not be construed as limited to the particular shapes of regions illustrated herein but are to include deviations in shapes that result, for example, from manufacturing. For example, an edge or corner region illustrated as having sharp edges may have somewhat rounded or curved features. Likewise, elements illustrated as circular or spherical may be oval in shape or may have certain straight or flattened portions. Thus, the regions illustrated in the figures are schematic in nature, and their shapes are not intended to illustrate the actual shape of a region or element of a device and are not intended to limit the scope of the disclosed embodiments.

Unless otherwise defined, all terms (including technical and scientific terms) used herein have the same meaning as commonly understood by one of ordinary skill in the art to which this inventive concept belongs. It will be further understood that terms such as those defined in commonly used dictionaries should be interpreted as having a meaning that is consistent with their meaning in the context of the relevant art and will not be interpreted in an idealized or overly formal sense unless expressly so defined herein.

Embodiments of the present invention provide an authenticating service of a chip using an intrinsic component. In a typical embodiment, an authenticating device is provided that includes an identification (ID) engine, a self-test engine, and an intrinsic component. The intrinsic component is associated with a chip and includes an intrinsic feature. The self-test engine retrieves the intrinsic feature and communicates it to the identification engine. The identification engine receives the intrinsic feature, generates a first authentication value using the intrinsic feature, and stores the authentication value in memory. The self-test engine generates a second authentication value using an authentication challenge. The identification engine includes a compare circuitry that compares the first authentication value and the second authentication value and generates an authentication output value based on the results of the compare of the two values.

In order to curb the spread of counterfeit hardware, it is necessary to develop methods to establish a hardware root of trust. Chip identifiers must be unique and hard to clone. The large amounts of memory embedded in chips provides a pathway to creating such keys by exploiting intrinsic properties from each bit cell which are a consequence of inherent variability in the chip manufacturing process.

Such hardware keys belong to the family of physically unclonable functions (PUFs), which suffer from a lack of strict reproducibility. Some PUFs based on DRAM are guaranteed to change very little between assessments, and can therefore be made practical by means of a fuzzy authentication algorithm. Because this approach always requires a pattern recognition approximate match, secure hashing is not possible, and authentication requires an off-chip fuzzy comparison of the chip response to the chip unique identification string originally kept in the manufacturers secure database. This requires large databases that can store all the pattern identifiers for every chip, and it requires communicating the identifier over a network. The systems and methods described herein present a solution that can be used with any intrinsic identifier which meets a minimum reproducibility threshold.

The self-authenticating intrinsic ID methodology employs an unclonable random bit pattern, preferably using embedded memory. A challenge is provided to create a bit pattern. The chip possesses intrinsic information that is unique to each chip and results from manufacturing variability. This information can be divided into two parts: a challenge/question and a response/answer. The question is preferably a combination of a subset of bit addresses belonging to the memory chip to be challenged under certain test conditions, such as chip voltage, chip temperature, or a specific pattern such as retention time (for DRAM). The response is the test result such as pass/fail for each tested bit, creating a bit pattern.

The bit pattern is converted into a binary string, which is encrypted and stored in memory, preferably eFUSE, within the same chip after generation. The original equipment manufacturers (OEM) database records the corresponding challenge, which is unique to each chip and to the intrinsic ID from each chip. The challenge may be used for encrypting and decrypting the bit pattern for creating the binary string stored in the memory, further improving security.

The key idea of the present invention is to enable 100% secure authentication. The OEM database searches the ID to find the corresponding challenge and sends it to the corresponding chip. When the chip is challenged with its corresponding challenge, it enables decryption of the binary string stored locally in memory to generate the original bit map. A valid challenge applied to a different chip will generate a different response because the probability of collision between responses is statistically negligible, while the challenges are tailored to ensure the uniqueness of the response set. Similarly, a valid bit pattern response stored in the chip's local memory bank can only be reproduced by the chip with a valid challenge. Since there are too many bit subsets in a memory chip and too many different challenges to choose from, a counterfeiter cannot determine the bit subset or the challenge with feasible resources in a cheap manner.

A comparator then performs a fuzzy or exact comparison between the resulting new pattern and the original bit map (in nonvolatile memory). A correct match results in the chip self-authenticating. The process is described in more detail below with reference to FIGS. 1-6.

FIG. 1a depicts an example implementation 100 of the self-authenticating intrinsic ID methodology. Implementation 100 includes authentication device 102. The device 102 may be integrated within a product chip, or arranged on a system board. Authentication device 102 includes identification (ID) engine 104, self-test engine 106, and intrinsic component 108. ID engine 104 includes ID challenge interface 110, ID function generator 112, memory 114, and compare circuitry (or comparator) 116.

The ID engine 104 uses an authentication challenge to authenticate the intrinsic component 108. The intrinsic component 108 may be one of the components used for a product chip. The intrinsic component is associated with the chip and includes an intrinsic feature 120. In one example, the intrinsic feature 120 is made up of a matrix of values.

The authentication challenge 130 supplied by the OEM database (i.e. server) provides the domain information used to generate the intrinsic ID (or authentication value). In this instance, the authentication challenge is location challenge 132. The domain information provided by the location challenge 132 is input to the self-test engine 106 to produce the domain address to access a specific address domain in the intrinsic component, preferably DRAM 108.

Figure 1B:
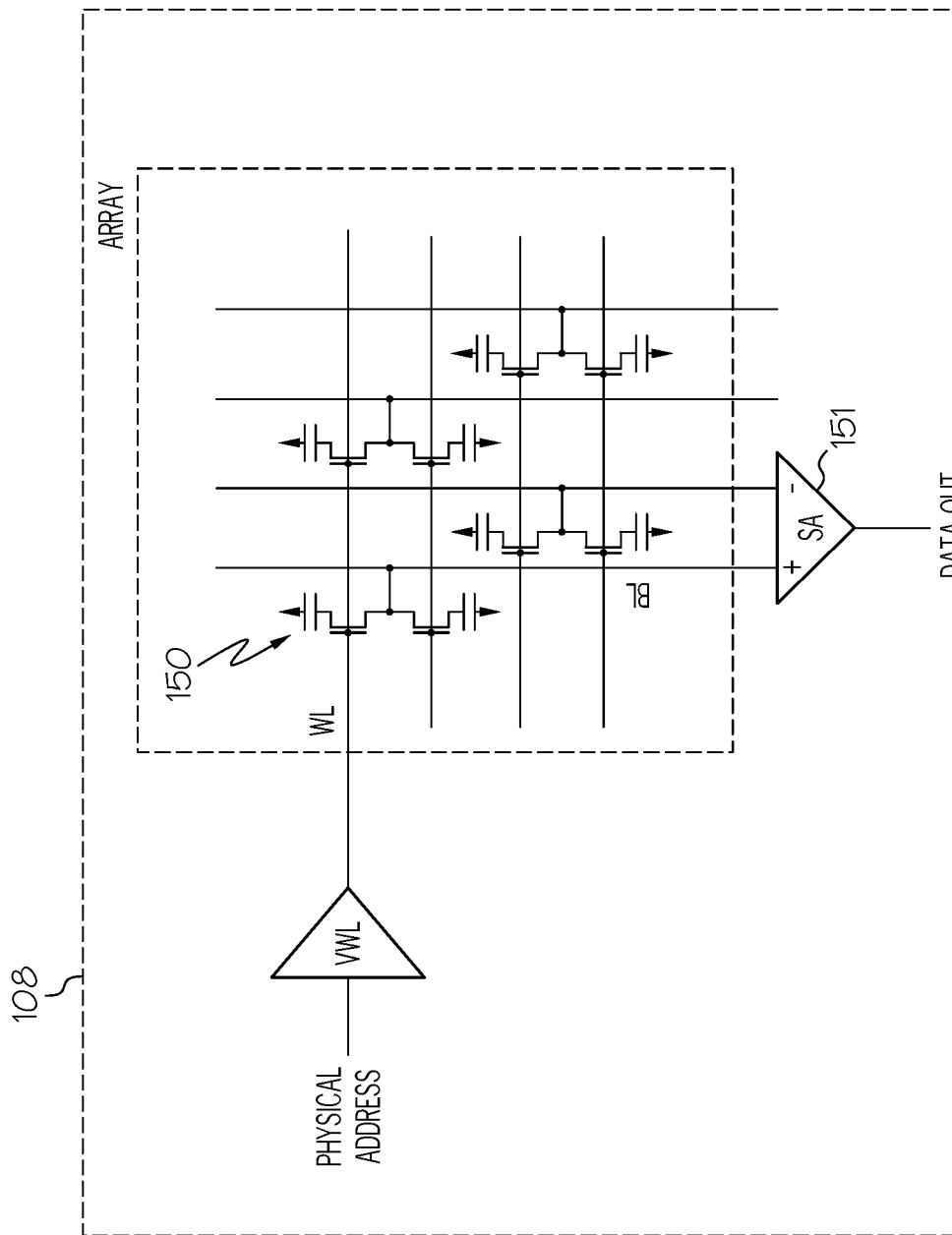
FIG. 1b depicts an example DRAM with 1 transistor/1 capacitor (1T1C) cells and a sense amplifier (SA).

FIG. 1b shows the details of the DRAM 108. The array consists of a plurality of 1 transistor/1 capacitor (1T1C) cells 150 which are controlled by wordline WL and Bitline. We write a 1 to every 1T1C cell in an area of the array, represented by the charge kept in the capacitors. After a pause, each cell is read and sensed by sense amplifier SA 151, and the output of SA is output to BIST 106. If the charge has not leaked to a logic zero, the output of SA is 1. If the charge has leaked to a logic zero, the output of SA is 0. In lieu of retention pause time tuning, $V_{WL}$ can be used as a tunable array input parameter to control the number of 0s and 1s from SA, because it controls the device leakage of the 1T1C cell. An increase in $V_{WL}$ (wordline voltage) leads to an increase in memory bit fail count without increasing the pause time, resulting in shorter time for ID generation.

Figure 2:
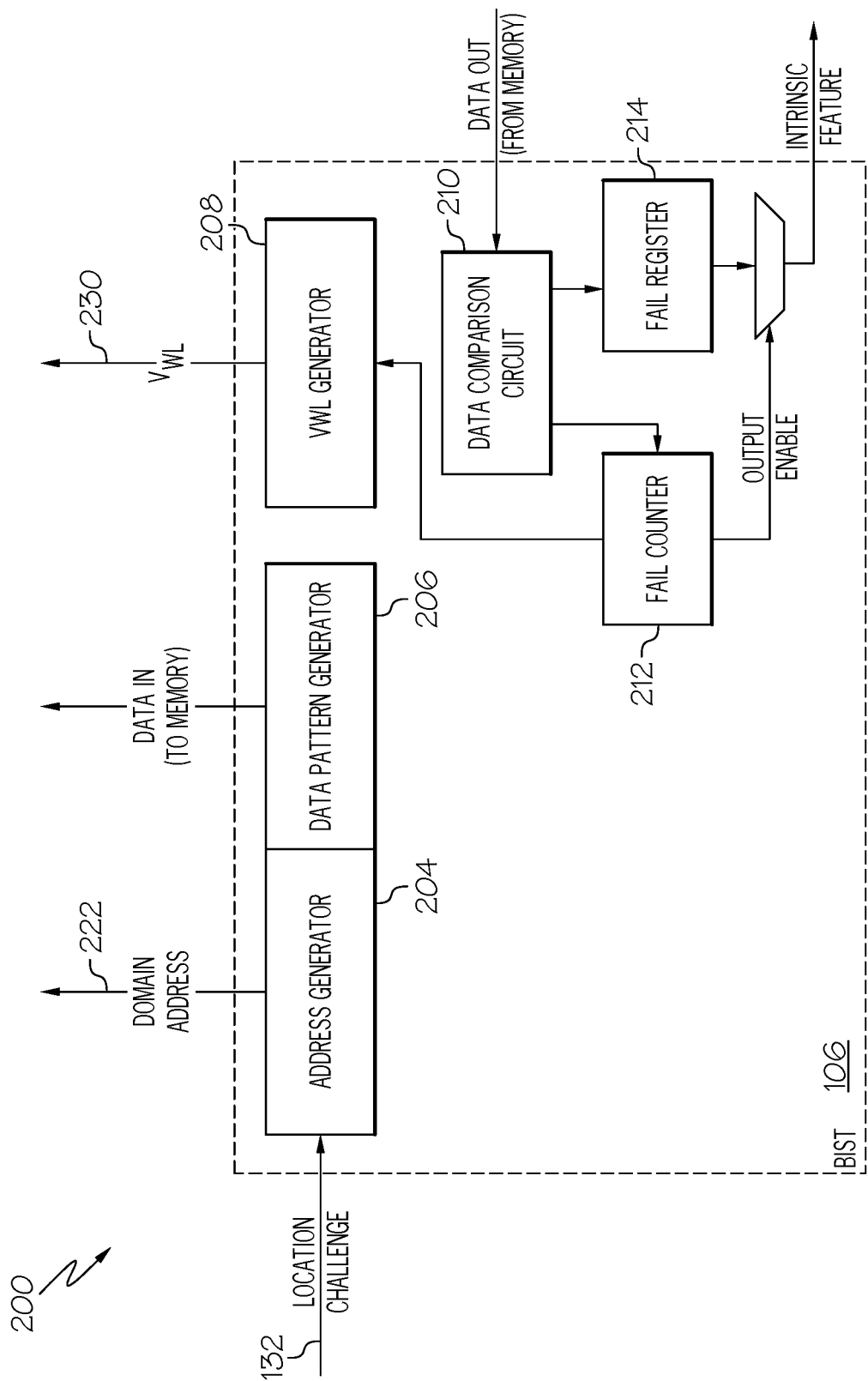
FIG. 2 depicts a diagram of an example self-test engine according to an embodiment of the present invention.

FIG. 2 depicts a diagram 200 of an example self-test engine (or BIST) 106 in FIG. 1 according to an embodiment of the present invention. As shown, BIST 200 (or 106 in FIG. 1) includes address generator 204, data pattern generator 206, $V_{WL}$ generator 208, data comparison circuit 210, fail counter 212, and fail register 214.

The BIST 106 performs the function of generating the domain address and the data pattern for testing the intrinsic component associated with the intrinsic feature, preferably DRAM 108. The location challenge 132 is provided to the address generator 204. The address generator uses the location challenge 132 to produce the domain (or physical) address 222 of the DRAM 108, or more specifically, the address to access the corresponding 1T1C cells 150.

The fail counter 212 counts the number of fails to check if it is equal to the number specified. If not, the $V_{WL}$ generator 208 varies the $V_{WL}$ to generate more fails until the required number of fails has been reached. In one example, the limit on the required number of fails may be set on the domains requested. In another example, the limit may be set for the entire memory. Upon generating the required number of fails, a vector pattern corresponding to the requested domain fails is generated at the fail register 214 and sent to the ID function generator 112 (FIG. 1).

Referring back to FIG. 1, the ID function generator 112 generates a first authentication value 122 on the function specified by the server in the authentication challenge 130 (i.e., location challenge 132). The ID function generator 112 performs the specified function. For example, the function may be a Bitwise OR on all the domain fail data (intrinsic feature 120) to generate the first authentication value 122. The first authentication value 122 is stored in memory 114 (eFUSE) specified in the authentication challenge 130. In computing, eFUSE is a technology developed by International Business Machines Corporation which allows for the dynamic real-time reprogramming of computer chips. Multiple such authentication values can be produced for the same chip and stored in eFUSE 114.

During authentication, the authentication challenge 130 supplied by the OEM database (i.e. server) specifies the domain addresses as previously mentioned. In this instance, the authentication challenge includes an ID function challenge 134 or memory challenge 136. A second authentication value 124 is generated from the domains as illustrated above using the ID function specified and the bit fails produced by the DRAM 108.

Figure 3:
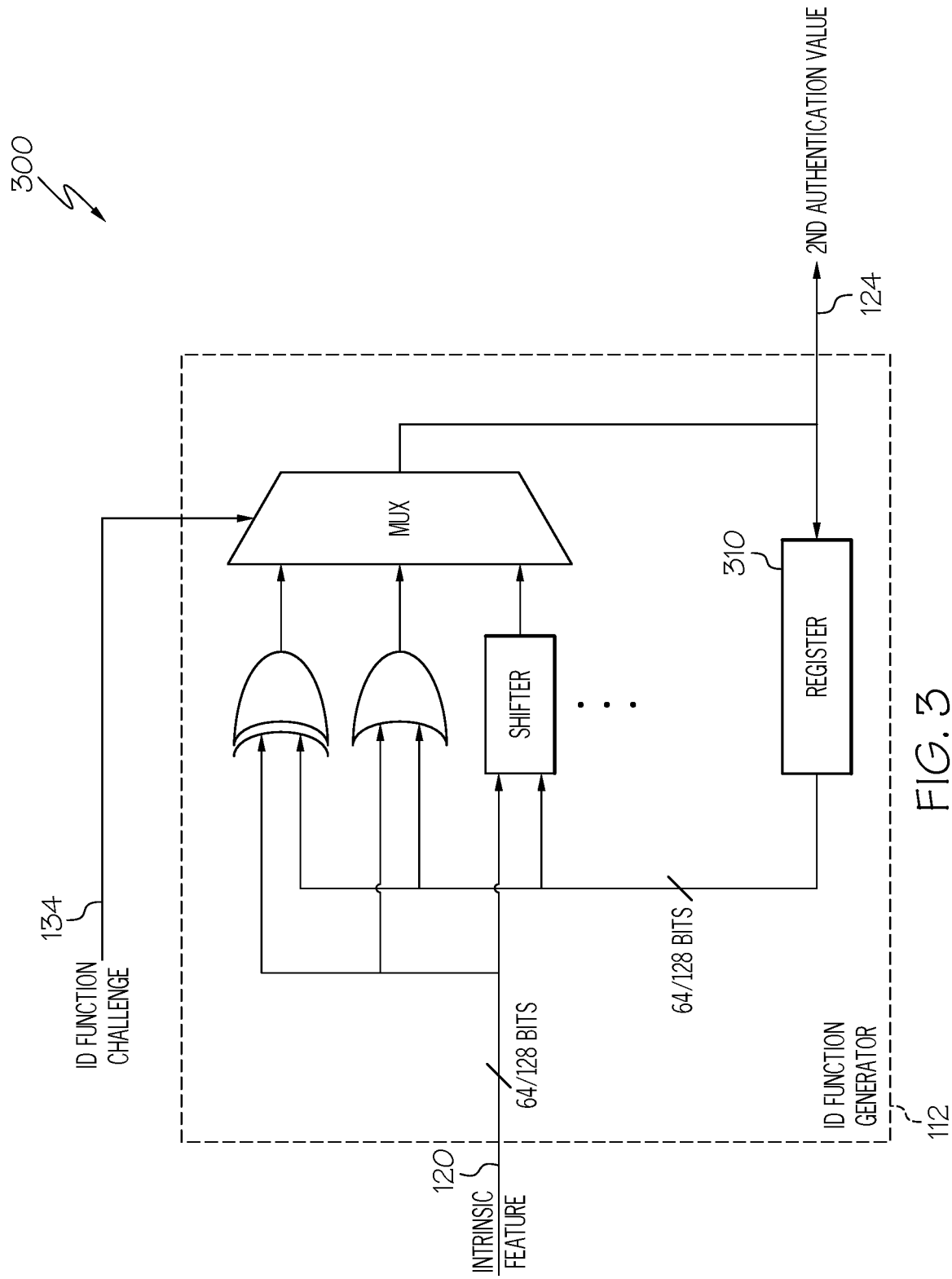
FIG. 3 depicts a diagram of an example ID function generator according to an embodiment of the present invention.

FIG. 3 depicts a diagram 300 of an example ID function generator 112 according to an embodiment of the present invention. The ID function generation is used to generate the $1^{st}$ authentication value 122 (not on FIG. 3 drawing) and the $2^{nd}$ authentication value 124. The ID function generator 112 may consist of different functions such as OR, XOR, shifter, and the like. These functions process the domain IDs (i.e., intrinsic feature 120) from all the domains generated by the BIST 106 (FIG. 2). The ID function to be used is specified by the ID function challenge 134 from the authentication challenge provided by the OEM database (i.e. server). A feedback register (register 310) stores the ID as it gets processed depending on the function. When all the domains determined by the authentication challenge have been processed, the ID stored in the register is sent for either storing in memory 114 (FIG. 1) (as the $1^{st}$ authentication value 122) or for comparison (as the $2^{nd}$ authentication value 124) with the 1st authentication value 122 to authenticate the chip. As depicted in FIG. 3, the 2nd authentication value 124 is generated.

Referring back to FIG. 1, the first authentication value 122 is compared with the second authentication value 124. An authentication output value 140 may be generated based on the results of the comparison. In one example, the compare circuitry 116 may be a fuzzy comparator.

Figure 4:
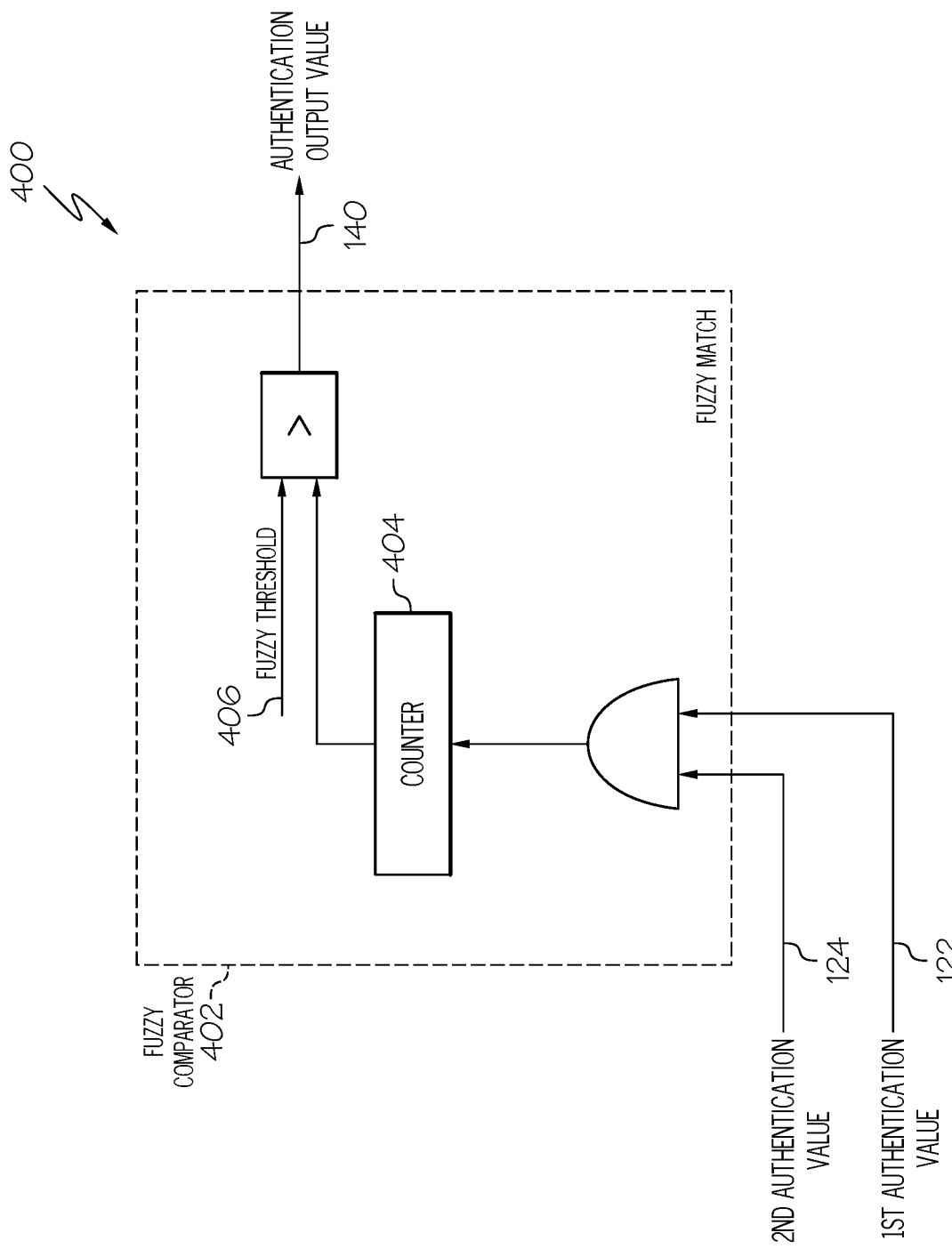
FIG. 4 depicts a diagram of an example fuzzy comparator according to an embodiment of the present invention.

FIG. 4 depicts a diagram 400 of an example fuzzy comparator 402 (according to an embodiment of the present invention). The fuzzy comparator may be used for the compare circuit 116 in FIG. 1. An intrinsic ID (i.e., authentication value) is known to lack strict reproducibility. Fuzzy pattern recognition, on the other hand, has been successfully demonstrated for DRAM chips. Using an upper and lower guard band for authenticated bits, the 1st authentication value 122 may be uniquely authenticated by comparison to the 2nd authentication value 124

The fuzzy comparator 402 compares the 1st authentication value 122 (i.e., the recorded eFUSE ID) with the 2nd authentication value 124 (i.e., the generated chip ID). The comparison may be implemented as a simple XOR or AND of the individual bits. A counter 404 counts the number of matches. The fuzzy comparator 402 may accommodate a specific number of matches to account for the variation in the generated authentication values. If the number of matches is smaller than a predefined fuzzy threshold 406, the fuzzy comparator 402 returns a mismatch indicating that the 1st authentication value 122 failed to match with the 2nd authentication value 124.

A one challenge-response pair approach provides a means of self-authentication, but it is an approach vulnerable to man-in-the-middle attacks. If a third party intercepts the result of the local match that the chip sends back to the OEM database (i.e., server), the third party can easily distinguish between a Yes or No, since there are only two outcomes.

Secure identification may be accomplished by generating multiple challenge-response pairs. Additionally, multiple challenges must be provided at each authentication step, generating a string of results from local response matches. Also, to avoid trivial result strings of Y or N, the questions must include a combination of true challenges and false challenges, which can be randomized at every authentication request from the challenges in the database, since there are guard bands ensuring a negligible number of collisions for challenges and responses belonging to different pairs. The string of 1s (Y) and 0s (N) may result in a bit string created after the intrinsic ID comparisons are made. The bit string has a definite expectation value on the OEM's side and must be reproducible. Such a string can be hashed for increased security by using a one-way function (irreversible), and if the results of the hash on the OEM's side and customer's side match, then the chip is securely authenticated. The expected output value generated by the OEM database for each challenge must match the authentication output value from the authentication device in order to result in confirmation of the chip's authenticity.

Figure 5:
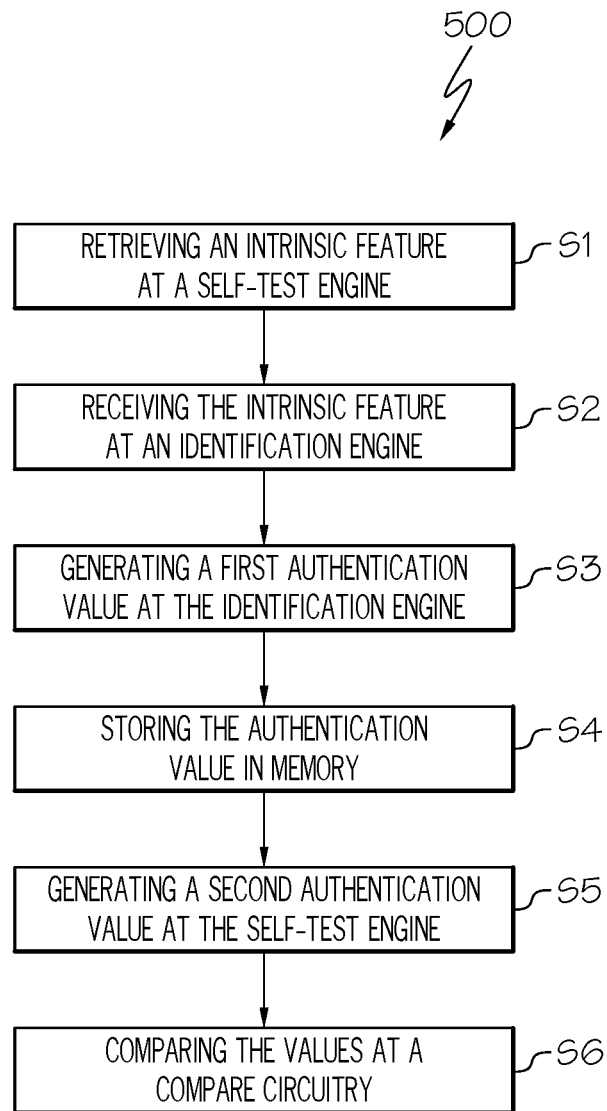
FIG. 5 depicts a method flow diagram for providing an authenticating service of a chip according to an embodiment of the present invention.

FIG. 5 depicts a method flow diagram 500 for providing an authenticating service of a chip according to an embodiment of the present invention. At S1, the intrinsic feature is retrieved at the self-test engine. At S2, the intrinsic feature is received at the identification (ID) engine. At S3, first authentication value is generated at the identification engine. At S4, the first authentication value is stored in memory. At S5, the second authentication value is generated at the self-test engine. At S6, the values are compared at a compare circuitry.

It will be appreciated that the exemplary method process flow 500 of FIG. 5 represents one possible implementation of a process flow for providing an authenticating service of a chip, and that other process flows are possible within the scope of the invention. The process flow illustrates the architecture, functionality, and operation of possible implementations of systems, methods, and computer program products according to various embodiments of the present invention. It should be noted that, in some alternative implementations, the functions noted in the blocks may occur out of the order noted in FIG. 5. For example, two blocks shown in succession may, in fact, be executed substantially concurrently.

Figure 6:
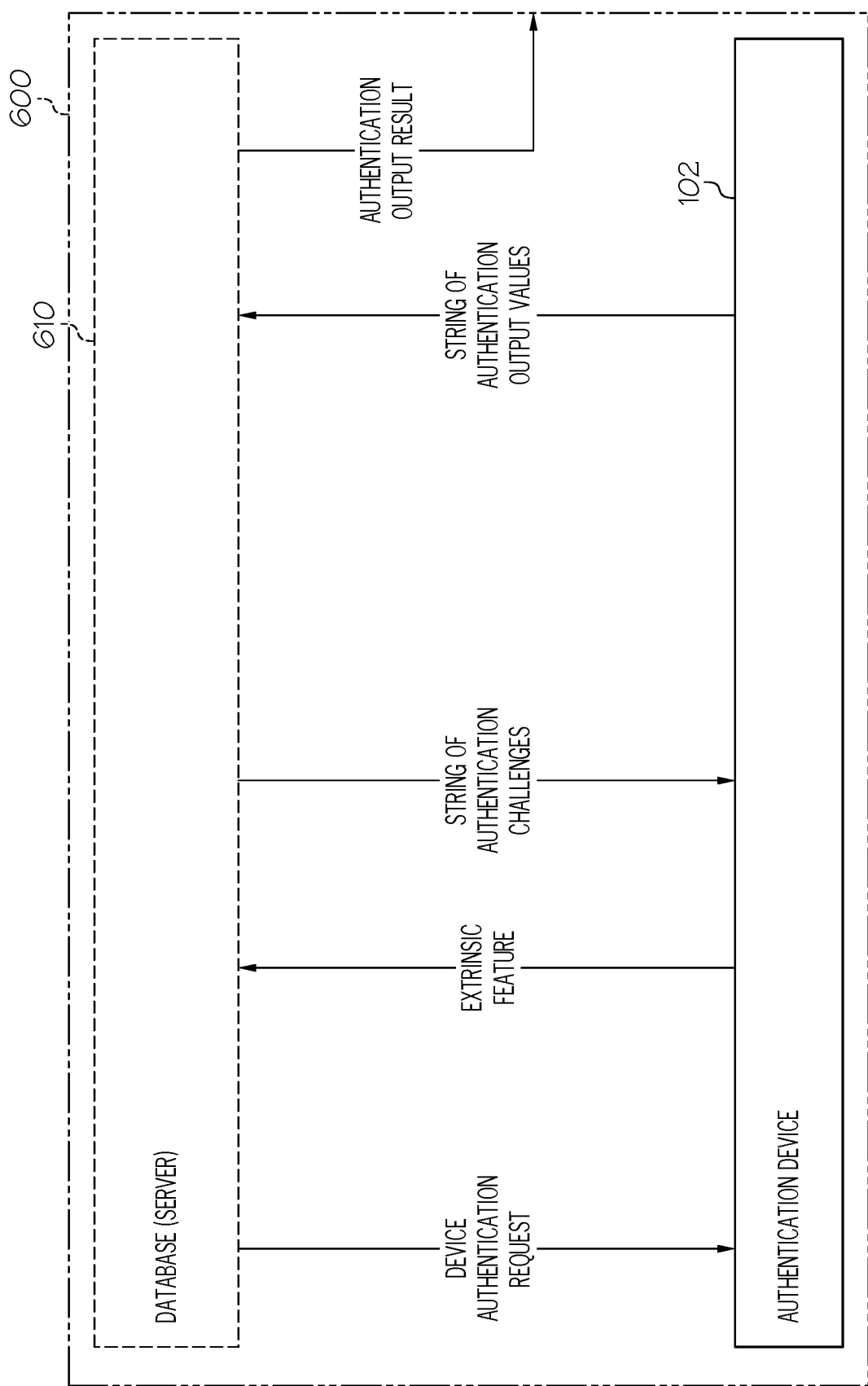
FIG. 6 depicts a system-level block diagram for secure authentication using a database and an authentication device according to an embodiment of the present invention.

FIG. 6 shows the system 600 which controls the authentication flow between the database 610 and the authentication device 102. The database 610 requests authentication from authentication device 102, which provides in turn an extrinsic feature back to the database. The database then generates an authentication challenge or a string of authentication challenges based on the value of the extrinsic feature. The authentication device returns an authentication output value or a string of authentication output values to the database. The database finally confirms the string of authentication output values from the authentication device 102, and generates an authentication output result. More specifically, the confirmation process includes at least one authentication output value from the authentication device corresponding to a match between the 1st authentication value and 2nd authentication value in FIG. 1, and preferably at least one authentication output value corresponds to a mismatch between the two.

Secure self-authentication follows from scaling this approach to a series of randomized challenges, of which a few are expected to result in a correct local match (at least one in order to avoid a trivial response). The new bit string comprised of all the false (0) and positive (1) matches is unique and exactly reproducible. This is analogous to a lie detector test with a secretly known set of absolute truths. The questions/challenges and answers/responses possess a truth table known only to the OEM, and every answer has only two outcomes (false—0 or positive—1). The chip itself does not possess key information that validates the local intrinsic information stored locally in memory. This key information that the OEM stores in a database is preferably the physical addresses of the group of bits possessing the intrinsic signature, which can be combined with a set of test conditions such as chip voltages, which may or may not include $V_{WL}$, and/or chip temperatures, which may or may not be controllable. A counterfeiter that copies the non-volatile component has a negligible chance of creating a chip that can be successfully validated due to the missing key information and the unclonability of the intrinsic memory signature.

In summary, this method and related circuits create secure reproducible random strings which are unique to each chip and derived from an intrinsic ID which does not need to be strictly reproducible. The resulting strings, which can be randomized at each authentication, are compatible with hashing algorithms, leading to increased security.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A system for providing an authenticating service of a chip, the system comprising:
   an authentication device comprising an identification engine, a self-test engine, and an intrinsic component associated with a chip and has an intrinsic feature;
   the self-test engine configured to retrieve the intrinsic feature and communicate the intrinsic feature to the identification engine, wherein the intrinsic feature is a bit pattern generated from a specified fail count;
   the identification engine configured to receive the intrinsic feature, generate a first authentication value using the intrinsic feature, and store the first authentication value in memory;
   the self-test engine further configured to generate a second authentication value using an authentication challenge,
   the identification engine further comprising a compare circuitry configured to compare the first authentication value and the second authentication value; and
   the compare circuitry further configured to generate an authentication output value based on the results of the compare of the first authentication value and the second authentication value.

2. The system according to claim 1, wherein the authentication device is embedded on the chip, or the authentication device and the chip are integrated on a board.

3. The system according to claim 1, further comprising a database configured to control the authentication challenge and store the authentication challenge and an extrinsic feature of the authentication device, wherein the extrinsic feature is associated with the intrinsic component.

4. The system according to claim 1, wherein the intrinsic feature comprises a matrix of values, wherein a subset of the matrix of values is an intrinsic feature subset.

5. The system according to claim 4, wherein the authentication challenge further comprises a location for each matrix value within the intrinsic feature subset.

6. The system according to claim 3, wherein the database confirms a string of authentication output values, from the authentication device, and generates an authentication output result.

7. The system according to claim 6, wherein the confirmation process includes at least one authentication output value from the authentication device corresponding to a match between the first authentication value and the second authentication value, and at least one authentication output value corresponds to a mismatch between the two.

8. The system according to claim 1, wherein the authentication challenge comprises a location challenge.

9. The system according to claim 1, wherein the authentication challenge comprises at least one of an identification (ID) challenge or memory challenge.

10. A method for providing an authenticating service of a chip, the method comprising:
    retrieving an intrinsic feature associated with a chip at a self-test engine, wherein the intrinsic feature is a bit pattern generated from a specified fail count;
    generating a first authentication value using the intrinsic feature at the identification engine;
    storing the first authentication value in memory;
    generating a second authentication value at the self-test engine using an authentication challenge;
    comparing the first authentication value and the second authentication value at a compare circuitry; and
    generating an authentication output value at the compare circuitry based on the results of the compare of the first authentication value and the second authentication value.

11. The method according to claim 10, further comprising controlling the authentication challenge at a database and storing the first authentication challenge and an extrinsic feature of the authentication device, wherein the extrinsic feature is associated with the intrinsic component.

12. The method according to claim 10, wherein the intrinsic feature comprises a matrix of values, wherein a subset of the matrix of values is an intrinsic feature subset.

13. The method according to claim 12, wherein the authentication challenge further comprises a location for each matrix value within the intrinsic feature subset.

14. The method according to claim 11, wherein the database confirms a string of authentication output values, from the authentication device, and generates an authentication output result.

15. The method according to 14, wherein the confirmation process includes at least one authentication output value from the authentication device corresponding to a match between the first authentication value and the second authentication value, and at least one authentication output value corresponds to a mismatch between the two.

16. The method according to claim 10, wherein the authentication challenge comprises at least one of a location challenge, identification (ID) challenge, or memory challenge.

17. A method for deploying a system for providing an authenticating service of a chip, the system comprising:
    an authentication device comprising an identification engine, a self-test engine, and an intrinsic component associated with a chip and has an intrinsic feature;
    the self-test engine configured to retrieve the intrinsic feature and communicate the intrinsic feature to the identification engine, wherein the intrinsic feature is a bit pattern generated from a specified fail count;
    the identification engine configured to receive the intrinsic feature, generate a first authentication value using the intrinsic feature, and store the first authentication value in memory;
    the self-test engine further configured to generate a second authentication value using an authentication challenge,
    the identification engine further comprising a compare circuitry configured to compare the first authentication value and the second authentication value; and
    the compare circuitry further configured to generate an authentication output value based on the results of the compare of the first authentication value and the second authentication value.

* * * * *